Sept. 6, 1938.     C. W. DAKE     2,129,199
BRAKE DRUM
Filed Jan. 21, 1936
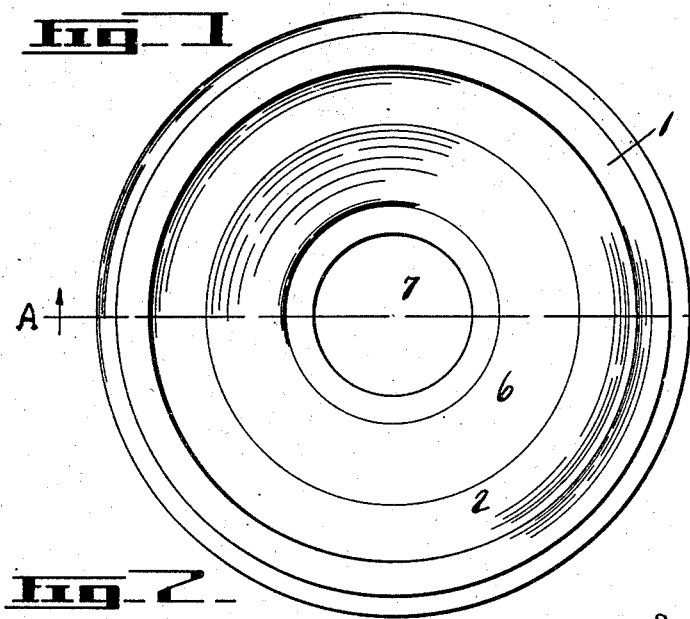
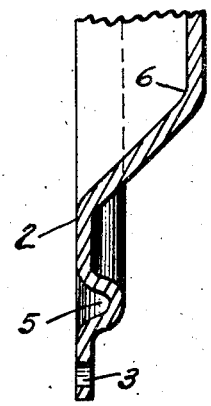
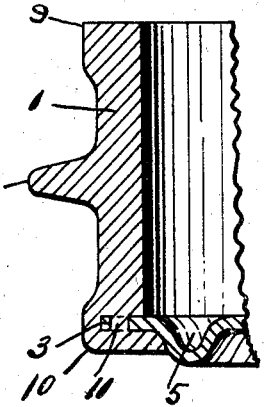
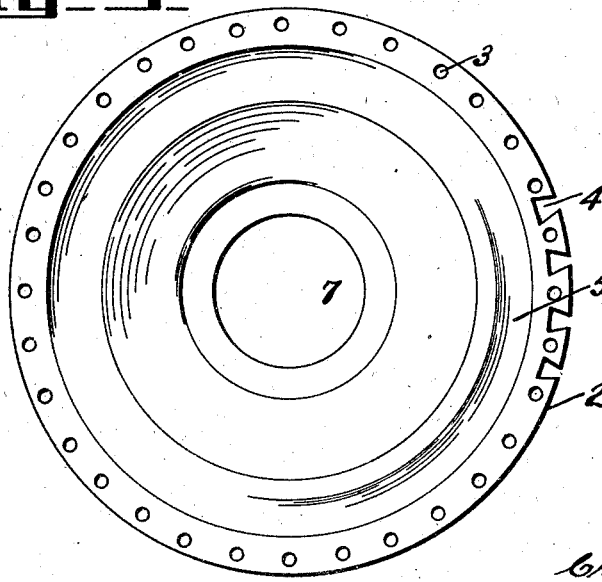
INVENTOR
Charles W. Dake Patented Sept. 6, 1938

2,129,199

UNITED STATES PATENT OFFICE 2,129,199

BRAKE DRUM

Charles W. Dake, Grand Haven, Mich.

Application January 21, 1936, Serial No. 60,019

2 Claims. (Cl. 188—218)

My present invention relates to improvements in brake drums for vehicles and to a novel and economical method of making my improved brake drum; and, the objects of my improvements are, first, to provide a brake drum for motor vehicles that will be cheap to make; second, to provide a brake drum that may be substantially balanced; third, to produce a brake drum wherein the strain, caused by unequal contraction when casting the braking band member onto the supporting member, will be minimized; and, fourth, to produce a brake drum that will not crack or be broken by reason of expansion of the braking band member when heated by the application of the brake mechanism for a considerable period of time.

I attain these objects and others that will be apparent from a perusal of the description of the method and the structure disclosed in the accompanying drawing, in which:

Fig. 1 is a view looking into the brake drum from its open side.

Fig. 2 is a sectional view taken on line A—A of Fig. 1.

Fig. 3 is a plan view of the braking band supporting member in its preferred form.

Fig. 4 is an enlarged fragmentary sectional view of a portion of the brake drum illustrating clearly the method of holding the braking band member and the supporting member together, and Fig. 5 is an enlarged fragmentary sectional view of a portion of the radially extending braking band supporting member.

Throughout the several views of the drawing, similar numerals refer to similar parts.

I refers to the braking band member cast upon the peripheral border of the braking band supporting member 2, having a plurality of holes 3, notches 4, or a combination of both holes and notches. Adjacent the braking band member I is annular strain relief corrugation 5. The braking band supporting member 2 is usually of a dished form as at 6 through which is the wheel hub receiving opening 7. The braking band member usually has one or more heat radiating ribs 8 and an enlarged diameter portion 9 with a reinforcing enlarged diameter portion 10 at the periphery of the braking band supporting member 2 and an inward radially extending annular flange engaging the corrugation 5. Through holes 3 is a shank 11 caused by the molten metal, when the braking band is cast, flowing through the holes 3.

In the production of my improved brake drum, I produce the braking band supporting member from sheet steel by forming and punching in suitable drawing and presses, prepare a mold as is usual in foundries, place the brake band supporting member in the mold, support it therein in its proper position, close the mold and introduce molten metal such as iron and its constituents of high temperature, at times exceeding 2900° F., in the mold onto the peripheral border of the braking band supporting member and into the holes and/or notches therein and when the molten metal has cooled sufficiently after solidifying that the cast metal has not hardened, remove the braking band member and the supporting member thereof and machine the braking band member at the outer and inner peripheries concentric with the brake drum's axis and at its two side edges.

In casting the braking band onto its support, the metal of the braking band member is of a very much higher temperature than the said supporting member, the peripheral edge of which is heated by the contacting molten metal. Therefore, the braking band member will shrink diametrically inwardly from all sides and in order to allow the braking band to shrink, the supporting member is provided with corrugation 5 which, because of its uniform thickness, springs inwardly as the braking band shrinks and prevents a rupture of the braking band member as the metal thereof congeals, which would occur if the supporting member were flat and rigid; also, when the braking band member is heated by friction due to the application of the vehicle brakes as when the vehicle travels down a long steep incline as is encountered in mountain driving, the braking band member expands and springs the corrugation walls outwardly whereas with a flat braking band support, the braking band would rupture at the point of the support connection.

In my present improved brake drum the corrugation 5 acts like an accordion bellows. It tends to straighten and flatten as the braking band expands, and tends to collapse as the braking band shrinks in size and thereby compensates for expansion or contraction of the braking band member.

Having described my invention, the rights I wish to claim and desire to secure by Letters Patent are:

1. A brake drum for vehicles, the said brake drum comprising in combination, a cylindrical braking band of cast metal having at the inner periphery thereof an axially extending braking surface and at one of its radially disposed sides an inwardly extending flange, a dish-shaped supporting back for said braking band having an annular corrugation and its periphery extending radially into the said braking band adjacent the said inwardly extending flange and engaged at one of its sides by the convex side of said corrugation.

2. A brake drum for vehicles, the said brake drum comprising in combination, a cylindrical braking band of cast metal having at the inner periphery thereof an axially extending braking surface and at one of its radially disposed sides an inwardly extending flange, and a supporting back for said braking band having its periphery extending radially outward into and embedded in the braking band, said supporting back also engaging at its outer side the said inwardly extending flange.

CHARLES W. DAKE.